United States Patent [19]

Turner

[11] Patent Number: 4,649,752

[45] Date of Patent: Mar. 17, 1987

[54] SHIM GAP PROBE

[75] Inventor: C. Warren Turner, Auburn, Wash.

[73] Assignee: The Boeing Company, Seattle, Wash.

[21] Appl. No.: 816,369

[22] Filed: Jan. 6, 1986

[51] Int. Cl.[4] .............................................. G01B 7/02
[52] U.S. Cl. .................................................... 73/760
[58] Field of Search ................ 73/760, 763, 767, 768, 73/772, 773, 774, 775, 781; 33/143 M, 143 L

[56] References Cited

U.S. PATENT DOCUMENTS

| 2,350,073 | 5/1944 | Simmons, Jr. | 201/63 |
|---|---|---|---|
| 2,423,867 | 7/1947 | Zener et al. | 201/63 |
| 2,576,489 | 11/1951 | Stovall, Jr. | 175/14.5 |
| 2,666,262 | 1/1954 | Ruge | 33/148 |
| 2,677,190 | 5/1954 | Shaw et al. | 33/178 |
| 2,815,424 | 12/1957 | Painter | 201/63 |
| 3,007,252 | 11/1961 | Munn | 33/178 |
| 3,036,283 | 5/1962 | Singdale et al. | 338/5 |
| 3,118,301 | 1/1964 | Bajenski et al. | 73/88.5 |
| 3,205,706 | 9/1965 | Tracy | 73/141 |
| 3,453,873 | 7/1969 | Lambert | 73/767 |
| 3,477,285 | 11/1969 | Krafft et al. | 73/88.5 |
| 3,534,479 | 10/1970 | Paine | 33/149 |
| 3,729,829 | 5/1973 | Lange et al. | 33/148 |
| 3,853,000 | 12/1974 | Barnett et al. | 73/763 |
| 4,109,386 | 8/1978 | Kinley et al. | 33/178 |
| 4,175,445 | 11/1979 | Templeton, III | 73/768 |
| 4,294,015 | 10/1981 | Drouin et al. | 33/174 |

FOREIGN PATENT DOCUMENTS

| 2018998 | 10/1979 | United Kingdom | 73/781 |
|---|---|---|---|
| 0956969 | 9/1982 | U.S.S.R. | 73/760 |
| 0968690 | 10/1982 | U.S.S.R. | 73/760 |

OTHER PUBLICATIONS

Chiku, "Subminiature Pressure Transducer—An Application of Semiconductor Strain Gauges", ISA Transactions, vol. 10, No. 1, 1971.

Primary Examiner—Michael J. Tokar
Assistant Examiner—Robert R. Raevis
Attorney, Agent, or Firm—Christensen, O'Connor, Johnson & Kindness

[57] ABSTRACT

A probe for use in determining the thickness of an interface gap between two parts is disclosed. The probe includes a wave spring (13) formed in one end of a thin, flat, elongate piece of resilient steel (11). The wave spring (13) includes three sinusoidal waves having a peak-to-peak separation that is greater than the maximum thickness of the gaps to be measured. Mounted on the wave spring (13), at the bottom of the concave depression (−) formed by each of the sinusoids are strain sensors (43a-d or 61a, b) positioned to sense the radial and circumferential strain applied to the wave spring (13) when the wave spring is positioned in a gap such that the wave spring sinusoids are compressed. Two or four strain sensors may be used to create a half or a full strain gauge bridge at the bottom of each concave depression. In the case of the half strain bridge arrangement, the remaining legs of the bridge are formed by "dummy" resistors located in a controlled environment remote from the wave spring. In a conventional manner, the strain gauge bridges control the magnitude of an electrical signal to provide a strain measurement that is indicative of the compression of the wave spring and, thus, thickness of the gap. Because the wave spring (13) has three sinusoids, information is provided by three strain bridges, allowing two-dimensional taper as well as single dimension thickness information to be produced.

21 Claims, 10 Drawing Figures

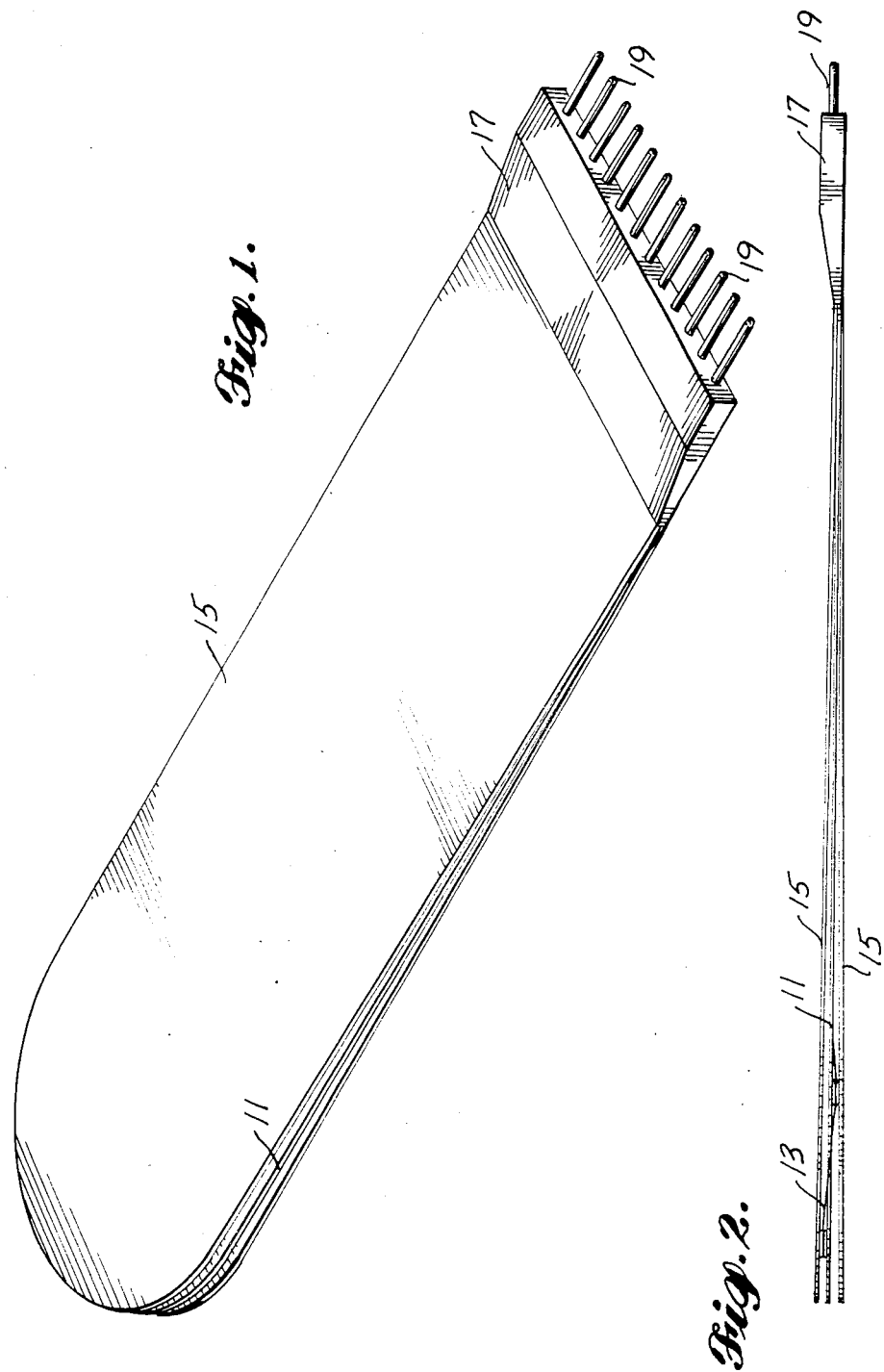

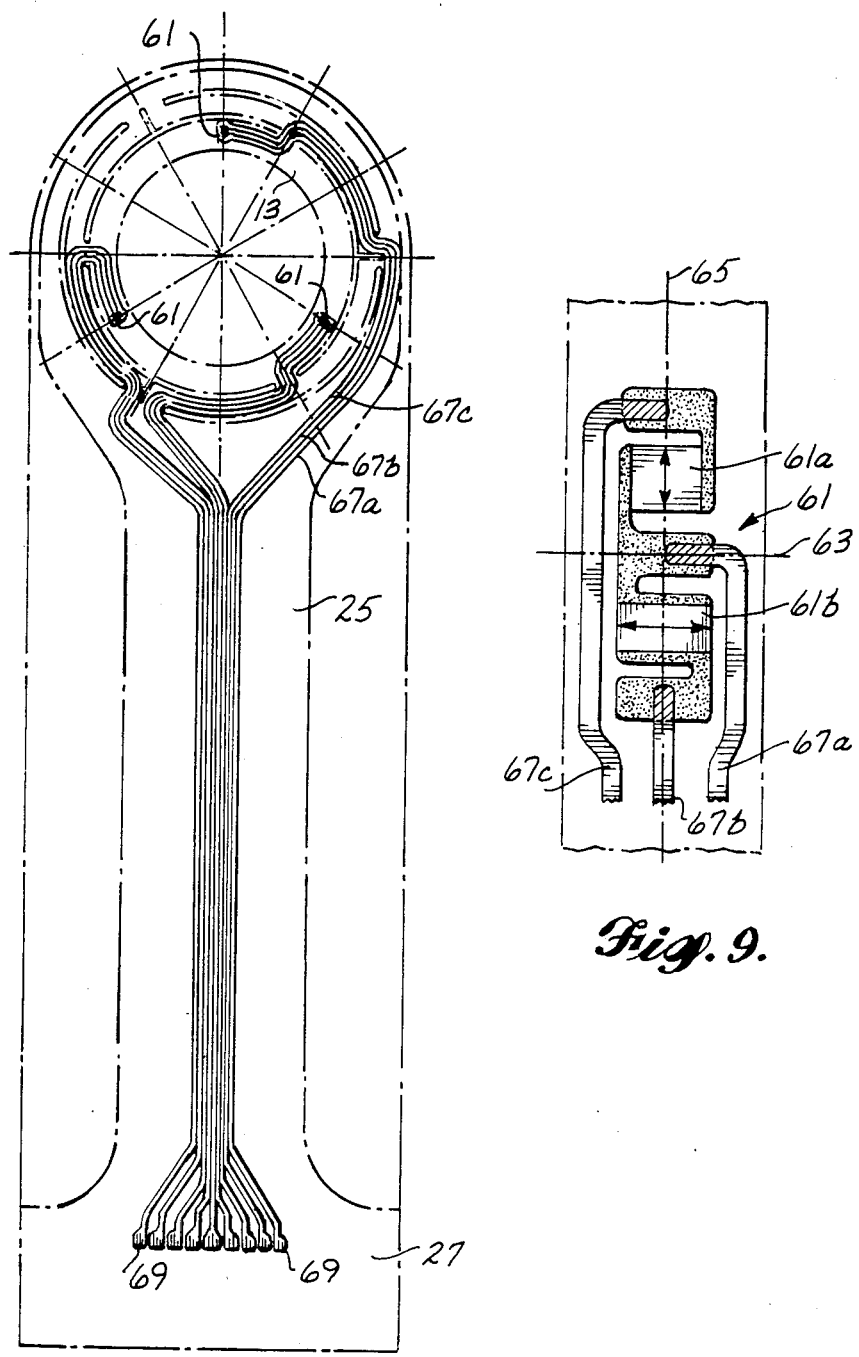

SHIM GAP PROBE

TECHNICAL AREA

This invention is directed to measuring instruments and, more particularly, instruments for measuring the thickness of a gap.

BACKGROUND OF THE INVENTION

All current aircraft airframe manufacturing techniques require structural shimming at interfacing surfaces where tolerance build up prevents net line fits. The current technique is to hand cut laminated shim material to create a shim sized to fill the gap between the interfacing surfaces. After hand fitting and contouring is completed the shim profile is trimmed with an aircraft shears. Because this technique is time consuming and labor intensive, it is undesirably expensive. It is also undesirable because the technique depends on the skill of the person that manufactures the shim, which varies from individual to individual.

Various proposals have been made to overcome the disadvantages associated with the foregoing technique. One proposal has been to form shim master molds and use the result to create the necessary shims. While useful in some situations, this technique is not useful in other circumstances, particularly where the gap to be filled by the shim is very narrow. Further, the master mold shims have to be hand tailored for each individual interface situation.

In order to overcome the foregoing and other disadvantages, proposals have been made to measure the gap between the surfaces to be shimmed and use the resultant information to create a shim. One prior art device for measuring interface gaps is a relatively large electromechanical tool. The tool includes a two-piece probe having lips that are suitable for insertion into the gap whose thickness is to be measured. The measuring portion of the device includes an electric motor coupled to the probe for moving the probe pieces apart, and a shaft angle encoder for measuring the separation between the tips of the probe. In addition to being an undesirably large and cumbersome hand tool, the device has the disadvantage of measuring the gap at a single point per insertion. Single point measurement is undesirable because at least three gap measurements taken at very precisely located, spaced-apart positions, which are precisely located with respect to the edges of the gap, are required in order to obtain all of the information needed to determine the planar profile of a shim. More specifically, three gap measurements at precise locations are needed because an interface gap, which is three dimensional, can taper in two directions. A single point electrochemical measuring device is undesirable because it must be manually moved to three precise positions in order to obtain the three measurements. Not only is precise manual positioning expensive because it is time consuming, the multiple manual positioning of a single point measuring device is more likely to result in errors than is the single manual positioning of a multiple point measuring device.

Microwave, profilometer and optical measurement devices have also been proposed to measure the thickness of interface gaps that need to be shimmed. As with the mechanical system described above, all of these proposals have the disadvantage of providing measurements at a single location per measurement. Because of the previously described difficulties associated with single location measurement devices, it is difficult to utilize the information generated by such devices to control a machine tool system designed to automatically create a shim based on precise measurement information. In addition, many of the prior art gap measuring devices are relatively bulky, making them unuseful when the gap whose thickness is to be measured is located near adjacent structure.

SUMMARY OF THE INVENTION

A probe for use in determining the thickness of an interface gap, i.e., a gap between two facing components, is disclosed. The probe includes a wave spring formed in one end of a thin, flat, elongate piece of resilient material. The wave spring includes at least three sinusoidal waves having a peak-to-peak separation that is greater than the maximum thickness of the gaps to be measured. Mounted on the wave spring, at the bottom of the concave depressions formed by each of the sinusoids are strain gauge sensors. Each depression supports at least two strain sensors oriented to sense the radial and circumferential strain applied to the wave spring when the wave spring is positioned in an interface gap. The strain sensors are combined to form strain gauge bridges. In a conventional manner the strain sensors control the magnitude of electrical signal flow through the bridge to provide a measurement that is indicative of the compression of the wave spring and, thus, the thickness of the gap. The use of at least three sinusoids provides two-dimensional taper, as well as thickness, information since three precisely positioned, spaced-apart thickness measurements are created.

In accordance with other aspects of this invention, the thin, flat, elongate piece of resilient material in which the wave spring is formed is extremely hard steel.

In accordance with further aspects of this invention, located on either side of the thin, flat, elongate piece of steel in which the wave spring is formed are thin, flat, elongate covers that prevent the wave spring from digging into the walls of a gap whose thickness is to be measured when the wave spring is being inserted.

In accordance with other aspects of this invention, the wave spring is supported by finger springs that run between the wave spring and the main body of the thin, flat, elongate piece of steel in which the wave spring is formed.

In accordance with still other aspects of this invention, the wave spring and finger springs are created by first chemically milling a thin, flat, elongate piece of resilient steel to create the desired shape. After the milling step is complete, the wave spring convolutions are created by inserting the chemically milled wave spring into a suitably shaped die. After the wave shapes are formed, the thin, flat, elongate piece of resilient steel containing the wave spring is heat treated and prestressed. Then the strain sensors are mounted at the bottoms of the depressions located on one side of the wave spring.

In accordance with other aspects of this invention, a channel is milled in the main body of the thin, flat, elongate piece of resilient steel between the wave spring and the remote end of the main body remote from the wave spring. Conductors, mounted in the channel, connect the strain sensors to connector elements designed to connect the shim gap probe to suitable electronic circuitry.

As will be readily appreciated from the foregoing description, the invention provides a shim gap probe suitable for measuring the thickness of the gap between two elements to be joined together, such as two components of an airframe. Because the shim gap probe includes a wave spring that measures thickness at three known, spaced-apart positions, the shim gap probe simultaneously provides all of the information needed to determine the taper of a shim in two orthogonal directions when the probe is located at a known position with respect to the edges of the gap. Because the probe is electronically based and includes connections for connecting the strain sensors to external circuitry, the probe can be manufactured in relatively small size. Because of its small size, the probe can be utilized to measure the thicknesses of gaps located adjacent to structural components, i.e., gaps positioned such that prior art gap measuring devices cannot be utilized.

BRIEF DESCRIPTION OF THE DRAWINGS

The foregoing and other advantages and features of this invention will become more readily appreciated as the same becomes better understood by reference to the following detailed description when taken in conjunction with the accompanying drawings wherein:

FIG. 1 is an isomeric view of a preferred embodiment of the invention;

FIG. 2 is a longitudinal side-elevational view of the embodiment of the invention illustrated in FIG. 1;

FIG. 9 is a plan view of the orientation of a half bridge sensor layout suitable for mounting in the depressions of a wave spring; and, FIG. 10 is a conductor diagram showing the path of conductors for connection to the strain sensors of the half bridge illustrated in FIG. 9.

DESCRIPTION OF THE PREFERRED EMBODIMENT

Figure 3:
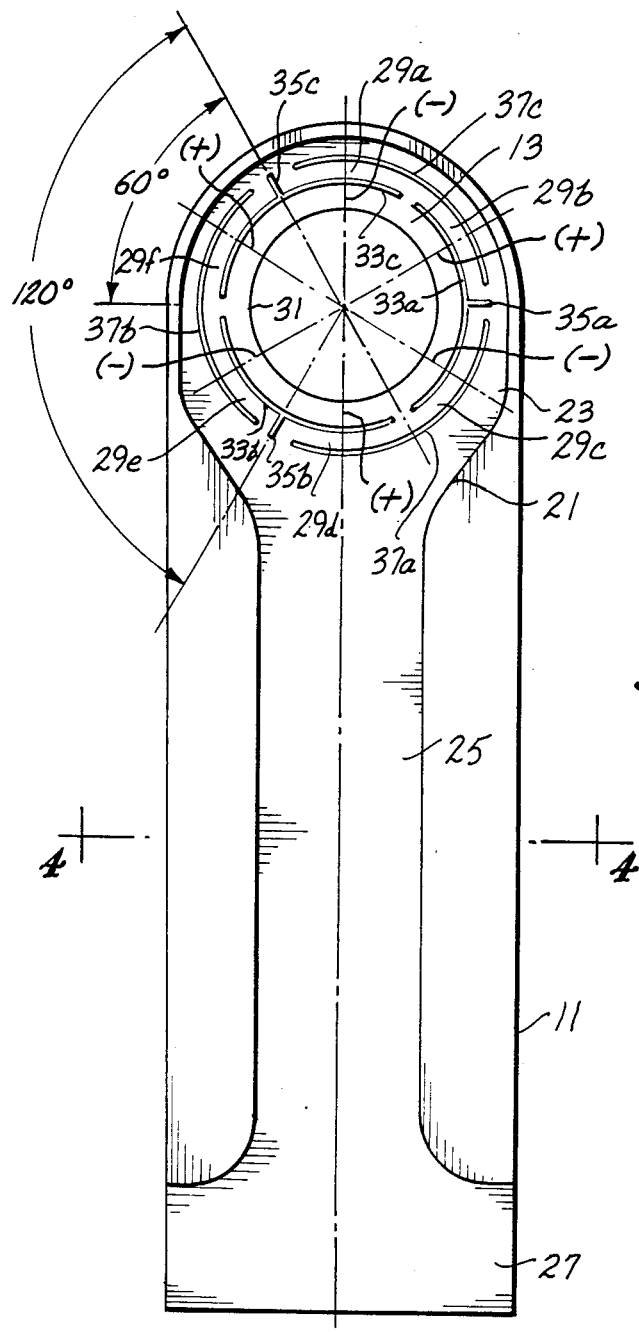
FIG. 3 is a plan view of a thin, flat, elongate sheet of resilient steel having a wave spring formed in one end, which forms a portion of the embodiment of the invention illustrated in FIGS. 1 and 2.

FIGS. 1 and 2 illustrate a shim gap probe formed in accordance with the invention that comprises a thin, flat, elongate piece of resilient steel 11 having a wave spring 13 formed in one end. The thin, flat, elongate piece of resilient steel 11 in which the wave spring is formed is covered on both sides by covers 15 that are also formed of thin, flat, elongate pieces of resilient steel. Located on the end of the sandwich formed by the wave spring piece of resilient steel 11 and the cover pieces of resilient steel 15 remote from the wave spring 13 is a connector block 17. The connector block 17 includes a plurality of outwardly extending male connector elements 19 lying in the plane of the sandwich.

Figure 4:
FIG. 4 is an enlarged, cross-sectional view along line 4—4 of FIG. 3.
Figure 5:
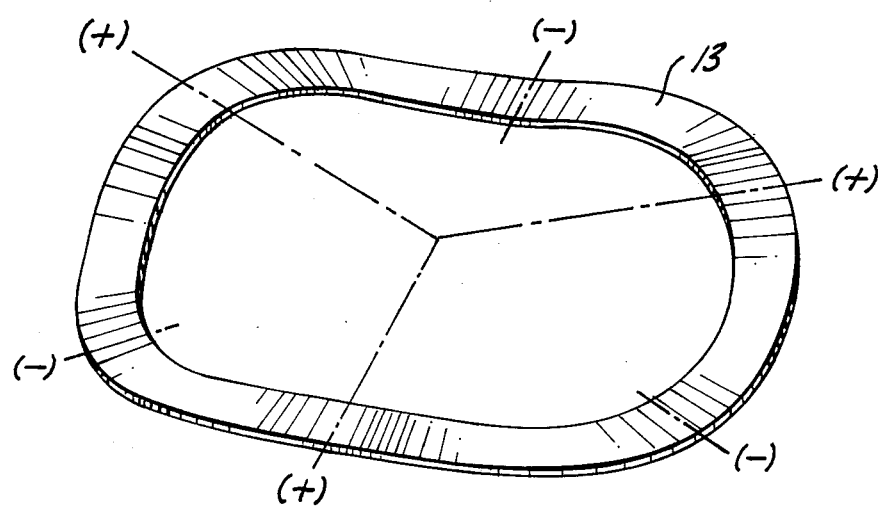
FIG. 5 is an isomeric view of the wave spring portion of the thin, flat, elongate piece of resilient steel illustrated in FIG. 4.

Preferably, the wave spring piece of resilient steel 11 is a piece of 17-7 PH corrosion resistant steel having a thickness not greater than ten thousandths of an inch that is chemically milled and processed in the manner described below. As best shown in FIG. 3, the stock piece from which the wave spring piece of resilient steel is formed has a rectangular end and a semicircular curved end. The wave spring 13 is formed in the semicircular curved end. As shown in FIGS. 3 and 4, one side of the wave spring piece of resilient steel includes a depression 21 formed of three distinct regions 23, 25 and 27. The first depression region 23 is located at the circular end of the piece of resilient steel. The first depression region is semicircular along an edge that lies parallel to, and slightly inwardly from, the semicircular end of the wave spring piece of resilient steel 11. After running parallel to the edges of the wave spring piece of resilient steel, the edges of the first depression region 23 converge inwardly, terminating at the beginning of the second depression region 25. The second or center depression region 25 lies along the central longitudinal axis of the wave spring piece of resilient steel 11. The second depression region 25 terminates at the third depression region 27, which lies along the rectangular end of the wave spring piece of resilient steel 11. Thus, the depression regions 23, 25 and 27 are defined by a thicker edge region having a pair of relatively wide legs that lie on either side of the second depression region 25 and a thin curved leg that extends around the periphery of the semicircular end of the wave spring piece of resilient steel 11. Preferably, after the depressions are milled, the thicker edge region has the thickness of the stock material and the base of the depression region has a thickness of four thousandths of an inch or less.

The wave spring includes at least three complete sinusoids of equal length. In FIG. 3 the location of the sinusoid valleys or depressions are identified by the symbol (−). The sinusoid hills or protrusions are identified by the symbol (+). In the illustrated embodiment of the invention, a wave valley and a wave hill are positioned on the longitudinal centerline of the wave spring piece of resilient steel 11 such that the valley (on the depression side) is located nearest the semicircular edge of the wave spring piece of resilient material 11. The remaining hills and valleys are alternately located along the wave spring 13 at equal angular positions, i.e., positions separated by 60°.

The wave spring 13 and six spring fingers 29a–f that support the wave spring are created in the wave spring piece of resilient steel 11 by chemically milling suitably shaped arcuate apertures in the first depression region 23. More specifically, the inner edge of the wave spring 13 is defined by a cylindrical hole 31 whose center is coaxial with the center of the semicircular edge of the wave spring piece of resilient steel. The outer edge of the wave spring 13 is defined by the inner edges of an inner set of three spaced-apart inner arcuate slots 33a, 33b and 33c of equal radius and equal arcuate length. The separations between the inner arcuate slots 33a, 33b and 33c are, thus, spaced apart by 120°. When viewed from the depression side, a separation is located at the midpoint between each valley (−) and hill (+) moving in a clockwise direction. When moving in a counterclockwise direction, separations are not located between the valleys (−) and the hills (+). Rather, located between each valley (−) and hill (+) is a short, outwardly extending radial slot 35a, 35b and 35c.

The inner edges of the finger springs 29a–f are defined by the outer edges of the inner arcuate slots 33a, 33b and 33c. The outer edges of the finger springs 29a–f are defined by the inner edges of an outer set of three spaced-apart arcuate slots 37a, 37b and 37c of equal radius and equal length. The center of the outer set of three spaced-apart slots 37a, 37b and 37c is coaxial with the center of the inner set of arcuate slots 33a, 33b and 33c. The separations between the outer set of arcuate slots 37a, 37b and 37c are located where the radial slots 35a, 35b and 35c that extend outwardly from the inner set of arcuate slots 33a, 33b and 33c are located. Thus, the separations between the outer set of arcuate slots 37a, 37b and 37c are located at the midpoints of the inner set of arcuate slots 33a, 33b and 33c and the separations between the inner set of arcuate slots are located at the midpoints of the outer set of arcuate slots. The six finger springs 29a–f previously referred to are defined by the regions lying between the inner and outer sets of arcuate slots 33a, 33b and 33c and 37a, 37b and 37c and between the radial slots 35a, 35b and 35c and the separation regions between the inner set of arcuate slots 33a, 33b and 33c.

After the wave spring piece of resilient steel bank is milled to create a wave spring and finger spring pattern of the type illustrated in FIG. 3 and just described, the wave spring region is placed in a closed die that convolutes the wave spring to create three complete sinusoidal waves having hills and valleys positioned at the (−) and (+) positions illustrated in FIG. 3 and heretofore described. Preferably, the closed die first creates three concave waves in one direction. Thereafter, the die is opened, the blank is inverted, and the die is closed to create three concave waves in the opposite direction. In one actual embodiment of the invention, the resulting peak-to-peak separation distance fell in the range of 0.090–0.095 thousandths of an inch. As the wave spring region is convoluted the wave spring diameter is decreased by a small amount. The finger springs 29a–f compensate for the material strain and deformation created by this decrease.

After the waves are formed, the structure is heat treated, preferably to condition CH900. After heat treatment, the wave spring is spanked, i.e., compressed quickly, to its solid height and released. Because the stresses in the wave exceed the proportional limit during spanking, some permanent set occurs. After spanking, the peak-to-peak wave height must exceed the maximum gap thickness to be measured. In the case of an actual embodiment of the invention, designed to measure gaps up to 65 thousandths of an inch, a peak-to-peak dimension of at least 85 thousandths of an inch was deemed satisfactory.

After spanking, strain sensors are mounted on one face of the wave spring. The strain sensors are located at the bottom of each of the depression (−) regions of the wave spring, when viewed from the depression side.

Depending upon the size of the resultant gauge, enough strain sensors to form a full strain guage bridge (FIGS. 6 and 7) or enough sensors to form a half strain guage bridge (FIGS. 9 and 10) can be mounted at the bottom of each depression. Regardless of which form is utilized, conductors run from the strain sensors along paths-of-travel that extend from the strain sensors to terminals located at the end of the second depression region 25 remote from the first or wave spring depression region 23. The conductor paths-of-travel and the details of the position of the strain sensors for both the full and half bridge forms of the invention are next described.

Figure 6:
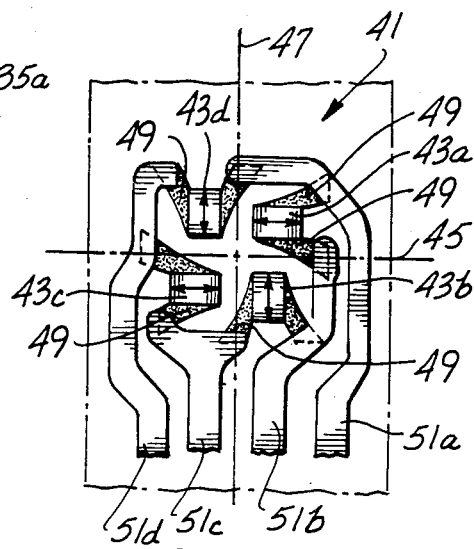
FIG. 6 is a plan view of a strain sensor full bridge layout suitable for mounting in the depressions of a wave spring.

FIG. 6 illustrates a strain gauge bridge 41 that includes four strain sensors 43a, 43b, 43c and 43d. One of the strain sensors lies in each of the quadrants defined by a pair of axes 45 and 47 that intersect at the bottom of the depression in which the strain gauges are mounted. One axis 45 is formed by a radial line that extends outwardly from the axial center of the wave spring 13. The second axis 47 is formed by a circumferential line that bisects the wave spring 13 in the plane of the flattened wave spring. The strain sensors are oriented such that the strain sensing axis of two of the strain sensors 43a and 43c lie parallel to the radial axis 45 and the strain sensing axis of the other two strain sensors 43b and 43d lie parallel to the circumferential axis 47. Each of the strain sensors includes two terminals 49. The terminals are selectively connected to four conductors 51a, 51b, 51c and 51d. More specifically, one terminal 49 of the first strain sensor 43a and one terminal 49 of the fourth strain sensor 43d are connected to the first conductor 51a. The second terminal 49 of the first strain sensor 43a and one terminal 49 of the second strain sensor 43b are connected to the second conductor 51b. The second terminal 49 of the second strain sensor 43b and one terminal 49 of the third strain sensor 43c are connected to the third conductor 51c. The second terminal 49 of the third strain sensor 43c and the second terminal 49 of the fourth strain sensor 43d are connected to the fourth conductor 51d. Thus, the conductors connect the terminals 49 such that the strain sensors form a full strain gauge bridge.

Figure 7:
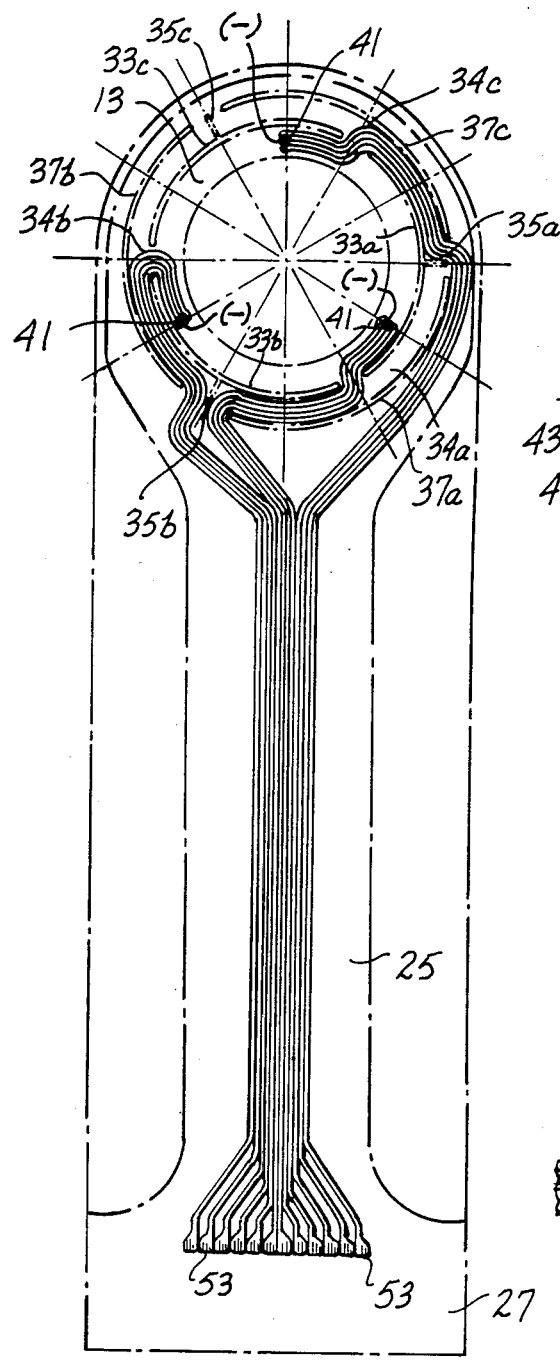
FIG. 7 is a conductor diagram showing the path of the conductors for connecting a strain sensor bridge of the type illustrated in FIG. 6 to terminals.

As illustrated in FIG. 7 a strain gauge bridge 41 of the type illustrated in FIG. 6 is located in each of the depressions of the wave spring 13. The paths-of-travel of the conductors 51a, 51b, 51c and 51d from the strain gauge bridges through the first and second depression regions 23 and 25 to terminals 53 located in the third depression region located at the rectangular end of the wave spring piece of resilient steel 11 is also shown in FIG. 7. The conductor path-of-travel are next described.

Beginning at the related strain gauge bridge 41, the path-of-travel of the conductors 51a, 51b, 51c and 51d proceeds along the surface of the wave spring 13 in the direction of the nearest separation 34a, 34b, or 34c between the inner set of arcuate slots 33a, 33b and 33c. After the conductors 51a, 51b, 51c and 51d pass through the separation they proceed along the related finger spring in the direction of the nearest separation between the outer set of arcuate slots 37a, 37b and 37c that also lies in the direction of the terminals 53. The conductors pass through the separation between the related radial slots 35a, 35b and 35c and the adjacent outer arcuate slot 37a, 37b and 37c. Thereafter, the conductors head toward the second depression region 25 whereat they join one another in a parallel array. At the end of the second depression region 25, the conductors fan outwardly into the third depression region 27, ending at the terminals 53. The terminals 53 are connected to the male connector elements 19 of the probe by conductors (not shown).

Preferably, the conductor arrays are formed using conventional microcircuit techniques. For example, the conductors may be laid down on a flexible substrate configured in the manner illustrated in FIG. 7 and heretofore described. Alternatively, polymer thin or thick film circuit techniques could be used as an alternative to microelectronic flexible circuit techniques. As will be readily understood by those familiar with polymer thin and thick film circuit techniques, such techniques involve the use of a metallic dust held in a polymer binder to create electrical conductors.

Figure 8:
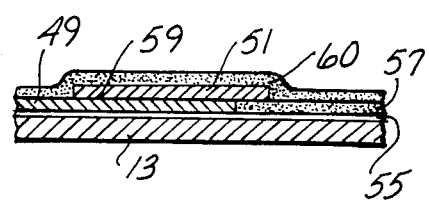
FIG. 8 is a cross-sectional view of the interconnection between the conductors of the type illustrated in FIG. 7 and strain sensors of the type illustrated in FIG. 6.

FIG. 8 illustrates one technique for joining the conductors 51a, 51b, 51c and 51d to the terminals 49 of the strain sensors 43a, 43b, 43c and 43d. More specifically, FIG. 8 is a cross-sectional view of the sandwich that occurs at a terminal 49. Beginning at the bottom, the sandwich first comprises the region of the wave spring 13 that underlies the strain gauge bridge 41. Located atop the wave spring 13 is a backing layer 55 that supports and positions the strain sensors 43a, 43b, 43c and 43d, and insulates the terminals from the wave spring. The terminals 49 and the strain sensors 43a, 43b, 43c and 43d are surrounded, and may be partially covered by, a first insulating film 57 formed of a suitable insulating material such as polyimide, for example. One suitable polyimide film is sold under the trademark KAPTON. The upper surfaces of the terminals are not covered by insulating film. The related conductor 51 overlies the illustrated terminal 49 and is electrically connected thereto by a sweat solder joint 59. Electrical protection for the conductors and the exposed part of the terminal is provided by a second insulating film 60 also formed of a suitable material, such as polyimide, that overlies the entire structure, i.e., the terminals, bridge and conductors.

While the inclusion of a full strain gauge bridge mounted at the bottom of each wave depression to measure the deflection of the sinusoids of the wave spring when the wave spring is compressed in a gap whose thickness is to be measured is the preferred way of carrying out the invention, in some embodiments of the invention the size of the shim gap probe makes it difficult, if not impossible, to utilize full bridges. In this regard, FIGS. 9 and 10 illustrate an alternative embodiment of the invention wherein a half bridge 61 is mounted in each of the depressions on one side of the wave spring 13. The remaining arms of the bridge form part of the electronic circuitry to which the strain sensors that form the half bridge are connected.

The half bridge illustrated in FIG. 9 includes first and second strain sensors 61a and 61b. The strain sensors 61a and 61b are positioned on opposite sides of the radial line 63 that intersects the depression in which the strain gauges are mounted. The strain sensors 61a and 61b are also positioned such that the sense axis of one of the strain sensors 61a lies along a circumferential line 65 that bisects the plane of the flattened wave spring 13. The other strain sensor 61b is positioned such that its sense axis lies orthogonal to the bisecting circumferential line 65. Three conductors 67a, 67b and 67c connect the strain sensors to terminals 69 located on the rectangular end of the wave spring piece of resilient steel 11. The first conductor 67a is connected to one terminal of each of the first and second strain sensors 61a and 61b. The second conductor 67b is connected to the other terminal of one of the strain sensors 61b and the third conductor 67c is connected to the other terminal of the other strain sensor 61a. As with the embodiment of the invention illustrated in FIGS. 6 and 7 and heretofore described, preferably the conductors 67a, 67b and 67c are formed using either conventional microelectronic flexible circuit techniques or using polymer thin or thick film circuit techniques. Further, as illustrated in FIG. 10, preferably, the conductors follow paths-of-travel between the locations of the half bridges and the terminals 69 similar to the paths-of-travel illustrated in FIG. 7 and heretofore described between the full bridges and their respective terminals. The terminals 69 are connected to electronic circuitry that includes two precision resistors housed in a temperature stable environment. The two precision resistors are connected such that the resistors, plus the strain sensors 61a and 61b form a full bridge.

As will be readily appreciated from the foregoing description, the invention provides a shim gap probe that functions something like an electronic feeler gauge. As a result, the device is user friendly. In order to use the device, the probe is positioned in a gap whose thickness is to be measured. Preferably, an outer surface of the probe includes gauge markings so that the probe can be inserted a predetermined distance into the gap. As a result, the position of the wave spring with respect to one edge of the gap is readily set. Positioning one of the longitudinal edges of the probe with respect to another edge of the gap fixes the position of the probe in the gap. This position information along with the known position of the strain bridges allows the centroid of the wave spring to be readily determined using conventional mathematics. This information, plus the thickness information determined by the strain applied to the wave spring, provides sufficient triangular information to determine the configuration, i.e., taper, in two orthogonal directions necessary to completely define a shim suitable for filling the gap. The strain information is generated in a conventional manner by the strain sensors modifying an electric current applied to the bridge. Prior to the use of the probe, the strain information produced by the bridges is calibrated in terms of gap thickness.

While the cover pieces 15 are preferred because of the protection they provide for the strain sensors and the conductors, it is to be understood that covers are not necessary to producing an operative embodiment of the invention. In addition to protecting the strain sensors and the conductors, the covers have the advantage that they prevent the wave spring from digging into softer metals, such as aluminum, when such metals define the walls of the gap.

While preferred embodiments of the invention have been illustrated and described, it will be appreciated that various changes can be made therein without departing from the spirit and scope of the invention. For example, the finger springs included in the illustrated embodiment of the invention are the maximum length finger springs that can be provided. While maximum length finger springs are desirable because of the decrease in the diameter of the wave spring that occurs when the waves are formed in the wave spring, shorter finger springs can be utilized. Further, the hills and valleys of the wave spring can be rotated to other orientations, if desired. In addition, more than three complete sinusoids can be formed in the wave spring, if desired. Consequently, the invention can be practiced otherwise than as specifically described herein.

The embodiments of the invention in which an exclusive property or privilege is claimed are defined as follows:

1. A probe for use in determining the thickness of a gap comprising:

a thin, flat, elongate piece of resilient material having a cylindrical wave spring formed in one end, said wave spring including at least three preformed convolutions protruding outwardly from the plane of said thin, flat elongate piece of material, said convolutions defining waves having depressions;

strain sensing means mounted on said wave spring in the depressions defined by said at least three convolutions for sensing the strain applied to said wave spring when the waves of said wave spring are compressed and producing strain information based on the amount of spring compression; and conductor means for connecting said strain sensing means to electronic circuitry suitable for analyzing the strain information sensed by said strain sensing means and, as a result, determining the amount of compression of said waves of said wave spring.

2. A probe as claimed in claim 1 wherein said strain sensing means includes a full strain gauge bridge mounted on one side of said wave spring in each of the depressions defined by said at least three convolutions.

3. A probe as claimed in claim 2 wherein each of said full strain gauge bridges includes four strain sensors, two of the strain sensors forming said strain gauge bridge having their sense axes lying parallel to a line that circumscribes said wave spring and the other two of the strain sensors forming said strain gauge bridge having their sense axes lying orthogonal to said line.

4. A probe as claimed in claim 1 wherein said strain sensing means includes a half strain gauge bridge mounted on one side of said wave spring in the depressions defined by said at least three convolutions.

5. A probe as claimed in claim 4 wherein each of said half strain gauge bridges includes two strain sensors, one of the strain sensors forming said half strain gauge bridge positioned such that its sense axis lies along a line that circumscribes said wave spring and the other of said strain sensors forming said strain gauge bridge positioned such that its sense axis lies orthogonal to said line.

6. A probe as claimed in claim 1 wherein said thin, flat, elongate piece of resilient material is steel.

7. A probe as claimed in claim 6 wherein said strain sensing means includes a full strain gauge bridge mounted on one side of said wave spring in each of the depressions defined by said at least three convolutions.

8. A probe as claimed in claim 7 wherein each of said full strain guage bridges includes four strain sensors, two of the strain sensors forming said strain gauge bridge having their sense axes lying parallel to a line that circumscribes said wave spring and the other two of the strain sensors forming said strain guage bridge having their sense axes lying orthogonal to said line.

9. A probe as claimed in claim 6 wherein said strain sensing means includes a half strain gauge bridge mounted on one side of said wave spring in the depressions defined by said at least three convolutions.

10. A probe as claimed in claim 9 wherein each of said half strain guage bridges includes two strain sensors, one of the strain sensors forming said half strain guage bridge positioned such that its sense axis lies along a line that circumscribes said wave spring and the other of said strain sensors forming said strain guage bridge positioned such that its sense axis lies orthogonal to said line.

11. A probe as claimed in claim 6 wherein said thin, flat, elongate piece of resilient steel includes a depression region extending from one end to the other and wherein said wave spring is formed in the depression region located at one end of said thin, flat, elongate piece of resilient steel.

12. A probe as claimed in claim 11 wherein said strain sensing means includes a full strain gauge bridge mounted on one side of said wave spring in each of the depressions defined by said at least three convolutions.

13. A probe as claimed in claim 12 wherein each of said full strain guage bridges includes four strain sensors, two of the strain sensors forming said strain guage bridge having their sense axes lying parallel to a line that circumscribes said wave spring and the other two of the strain sensors forming said strain guage bridge having their sense axes lying orthogonal to said line.

14. A probe as claimed in claim 11 wherein said strain sensing means includes a half strain gauge bridge mounted on one side of said wave spring in the depressions defined by said at least three convolutions.

15. A probe as claimed in claim 14 wherein each of said half strain guage bridges includes two strain sensors, one of the strain sensors forming said half strain guage bridge positioned such that its sense axis lies along a line that circumscribes said wave spring and the other of said strain sensors forming said strain gauge bridge positioned such that its sense axis lies orthogonal to said line.

16. A probe as claimed in claim 11 wherein said thin, flat, elongate piece of resilient steel includes finger springs extending between said wave spring and the portion of said thin, flat, elongate piece of resilient steel adjacent to the periphery of said wave spring.

17. A probe as claimed in claim 16 wherein said finger springs are also formed in said depression region.

18. A probe as claimed in claim 17 wherein said strain sensing means includes a full strain gauge bridge mounted on one side of said wave spring in each of the depressions defined by said at least three convolutions.

19. A probe as claimed in claim 18 wherein each of said full strain guage bridges includes four strain sensor, two of the strai sensors forming said strain gauge bridge having their sense axes lying parallel to a line that circumscribes said wave spring and the other two of the strain sensors forming said strain guage bridge having their axes lying orthogonal to said line.

20. A probe as claimed in claim 17 wherein said strain sensing means includes a half strain gauge bridge mounted on one side of said wave spring in the depressions defined by said at least three convolutions.

21. A probe as claimed in claim 20 wherein each of said half strain guage bridges includes two strain sensors, one of the strain sensors forming said half strain guage bridge positioned such that its sense axis lies along a line that circumscribes said wave spring and the other of said strain sensors forming said strain guage bridge positioned such that its sense axis lies orthogonal to said line.

* * * * *